Feb. 8, 1955  W. P. GALLAGHER ET AL  2,701,845
THRUST BEARING FOR ELECTRIC MOTORS
Filed Jan. 29, 1954
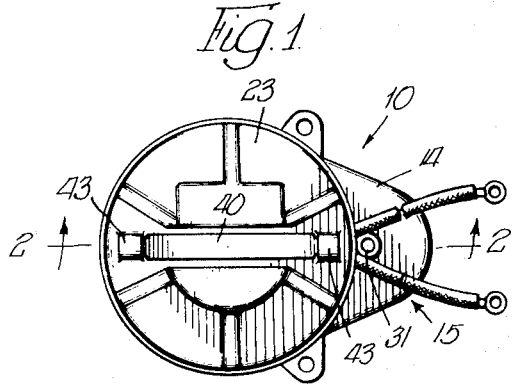
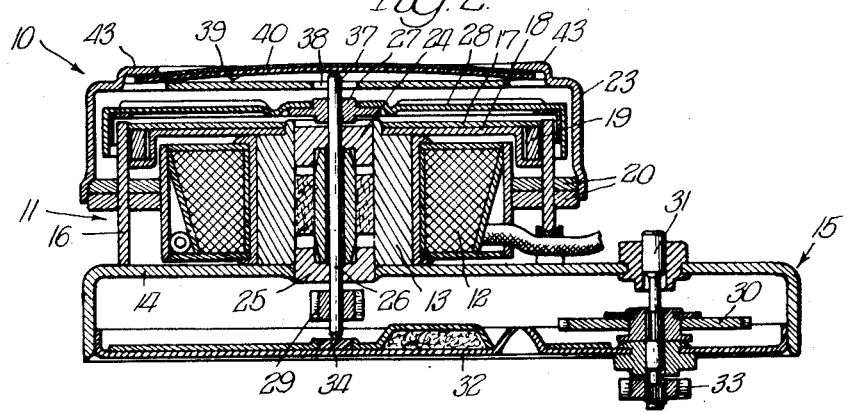
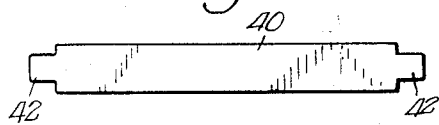
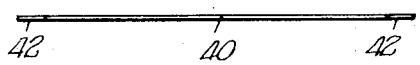
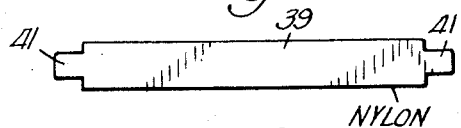
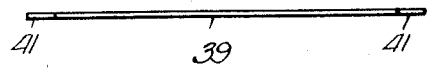
INVENTORS
William P. Gallagher,
Curt J. Courant,

United States Patent Office 2,701,845
Patented Feb. 8, 1955

2,701,845

THRUST BEARING FOR ELECTRIC MOTORS

William P. Gallagher and Curt J. Courant, Chicago, Ill., assignors to International Register Company, Chicago, Ill., a corporation of Illinois Application January 29, 1954, Serial No. 406,948

6 Claims. (Cl. 310—90)

This invention relates, generally, to the construction of electric motors, and it has particular relation to thrust bearings therefor. This invention is an improvement over the electric motor construction disclosed in Gallagher Patent No. 2,615,069, issued October 21, 1952, to the assignee of this application.

Among the objects of this invention are: To counteract end thrust on the shaft of a motor of the type shown in the Gallagher patent when it is operated with the rotor on the underside where the force of gravity acts on it to pull it away from the stator; to reduce noise incident to operation of this type of motor, particularly when it is operated as just stated; to accomplish this by mounting a thrust bearing on the cover enclosing the rotor for engagement with the adjacent end of the shaft on which the rotor is mounted; to urge the thrust bearing by resilient means against the shaft with a force about equal to the weight of the rotor and shaft; to employ a spring strip removably mounted on the cover for urging the thrust bearing into operative engagement with the shaft; and to employ a nylon strip for the thrust bearing of the same general configuration as the spring strip.

Other objects of this invention will, in part, be obvious and in part appear hereinafter.

This invention is disclosed in the embodiments thereof shown in the accompanying drawing, and it comprises the features of construction, combination of elements, and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawing, in which:

Figure 1 is a top plan view of an electric motor in which the present invention is embodied;

Figure 2 is a transverse sectional view, at an enlarged scale, taken generally along the line 2—2 of Figure 1 to illustrate in greater detail the features of construction of the motor and the manner in which the present invention is applied thereto;

Figure 3 is a top plan view of the spring strip shown in Figure 2 which is employed for urging the thrust bearing against the shaft;

Figure 4 is a view, in side elevation, of the spring strip shown in Figure 3;

Figure 5 is a top plan view of the nylon strip which constitutes the thrust bearing; and Figure 6 is a view, in side elevation, of the thrust bearing shown in Figure 5.

Referring now particularly to Figures 1 and 2 of the drawing, it will be observed that the reference character 10 designates, generally, an electric motor construction which, except for the thrust bearing arrangement of the present invention, is the motor construction disclosed in the Gallagher patent above referred to. Accordingly, only a general description of the details of the motor construction will be set forth herein, reference being had to the Gallagher patent for a more complete description of the construction and mode of operation.

The electric motor construction 10 includes a stator, shown generally at 11, which is arranged to be energized by a winding 12 that can be connected for energization to a suitable alternating current source, such as a 110-volt, 60 cycle source. The winding 12 surrounds a magnetic core 13 which forms a part of the magnetic circuit for the stator. The magnetic circuit extends through a plate 14 which forms the top of a gear case that is shown, generally, at 15. Surrounding the winding 12 and attached to the plate 14 is a magnetic field ring 16, the outer end of which interfits with polar projections on an outer field plate 17 and an inner field plate 18, both secured, as shown, to the outer end of the core 13. A shading ring 19 threads through the polar projections from the field plates 17 and 18 and shading rings 20 cooperate with the magnetic field ring 16, all as explained in the Gallagher patent, to provide a shifting magnetic field on energization of the winding 12 with suitable alternating current.

With a view to enclosing the outer end of the stator 11, a cup-shaped cover 23 is employed and it is arranged to have its rim telescoped over the magnetic field ring 16 and to have a friction fit with the outer peripheries of the shading rings 20. Not only does the cover 23 serve to enclose the outer end of the stator 11, but it also serves, as described hereinafter, to support a thrust bearing constructed and arranged in accordance with this invention.

It will be noted that the core 13 is hollow and that it has bearings 24 and 25 at its ends in which a shaft 26 is journaled. At the upper end of the shaft 26, as shown in Figure 2, there is a sleeve member 27 which is fast thereon and is arranged to support a rotor 28 which is generally cup-shaped and is arranged to be driven by the shifting magnetic field which is generated when the winding 12 is energized. While the sleeve member 27 and rotor 28 are referred to by separate reference characters, it will be understood that the application of the term "rotor" includes both.

At the lower end of the shaft 26, as viewed in Figure 2, there is a pinion 29 which is driven on energization of the winding 12. The pinion 29 is connected through a gear train (not shown) to a gear 30 which is fast on a shaft 31, which is journaled at one end on a plate 14 and projects through a cover plate 32 which forms the other side of the gear case 15. Externally of the gear case 15 and fast on the shaft 31 is a pinion 33 for connection to whatever mechanism is to be driven by the motor 10.

The end thrust at the lower end of the shaft 26, as viewed in Figure 2, is taken by a nylon thrust bearing 34 which is carried by the cover plate 32. As long as the motor 10 is operated in the position shown in Figure 2 with the rotor 28 at the upper end of the stator 11, it operates quietly and with a minimum of wear on the bearings 24 and 25. While the motor construction has been highly satisfactory when it was operated in the position shown in Figure 2, some difficulty has been encountered when it was necessary to operate the motor 10 with the rotor 28 on the underside of the stator 11, i. e. with the motor 10 turned upside down from its position shown in Figure 2.

In accordance with this invention, provision is made for applying an end thrust to the end 37 of the shaft 26 so that, when the motor 10 is operated in the upside down position from that shown in Figure 2, the rotor 28 and shaft 26 will remain in the same relative position to the stator 11 that they occupy when the motor is positioned as shown in Figure 2. It will be noted that the end 37 of the shaft 26 extends through an aperture 38 in the cover 23 and its end bears against a thrust bearing 39 in the form of a nylon strip, the configuration of which is shown more clearly in Figures 5 and 6 of the drawing. The nylon thrust bearing 39 is held in position and is urged against the end 37 of the shaft 26 by a spring strip 40, the configuration of which is shown more clearly in Figures 3 and 4 of the drawing. It will be observed that the nylon thrust bearing 39 and the metallic spring strip 40 have identical configurations and, in fact, are made from the same dies. Also it will be noted that the ends 41 of the nylon thrust bearing 39 and the ends 42 of the spring strip are reduced for interfitting with lugs 43 which are struck up from the cover 23. The spring strip has sufficient strength so that it urges the nylon thrust bearing 39 against the end 37 of the shaft 26 with a force equal to the weight of the shaft 26, the sleeve member 27, and the rotor 28. As stated hereinbefore, the sleeve 27 is considered to be a part of the rotor when reference is made thereto in the claims.

When the electric motor construction 10, as shown in Figure 2, is operated with the rotor 28 at the underside of the stator 11 or in the upside down position, the force exerted by the spring strip 40 against the thrust bearing 39 is sufficient to balance the downward thrust of gravity acting on the shaft 26, sleeve member 27 and rotor 28. The ends of the shaft 26 then are held between the nylon thrust bearing 34 and the nylon thrust bearing 39.

Since certain changes can be made in the foregoing construction and different embodiments of the invention can be made without departing from the spirit and scope thereof, it is intended that all matters shown in the accompanying drawing and described hereinbefore shall be interpreted as illustrative and not in a limiting sense.

What is claimed as new is:

1. In an electric motor construction, in combination, an annular frame, a shaft journaled on said frame and projecting beyond at least one end thereof, a rotor fast on said shaft at said one end of said frame with said shaft projecting therebeyond, electric field generating means carried by said frame for driving said rotor, a cover enclosing said rotor and telescoped with said frame, said cover having an aperture through which said shaft projects, a thrust bearing carried by said cover on the outer side thereof and cooperating with the projecting end of said shaft to limit endwise movement thereof, a resilient strip extending transversely of said aperture and urging said thrust bearing against said shaft with a force equal to the weight of said shaft and rotor whereby, when the motor is positioned with said cover on the underside, the force of gravity biasing said shaft and rotor downwardly is counteracted by said resilient strip, and lugs struck from said cover and interfitting with the ends of said resilient strip to hold the same in operative position.

2. In an electric motor construction, in combination, an annular frame, a shaft journaled on said frame and projecting beyond at least one end thereof, a rotor fast on said shaft at said one end of said frame with said shaft projecting therebeyond, electric field generating means carried by said frame for driving said rotor, a cover enclosing said rotor and telescoped with said frame, said cover having an aperture through which said shaft projects, and a thrust bearing carried by said cover on the outer side thereof and cooperating with the projecting end of said shaft to limit endwise movement thereof, a resilient metallic strip extending transversely of said aperture and urging said thrust bearing against said shaft with a force equal to the weight of said shaft and rotor whereby, when the motor is positioned with said cover on the underside, the force of gravity biasing said shaft and rotor downwardly is counteracted by said resilient strip, and lugs struck from said cover and interfitting with the ends of said resilient strip to hold the same in operative position, said thrust bearing comprising a strip of nylon co-extensive with said resilient strip and having the ends extending underneath said lugs.

3. In combination in an electric motor construction, a cover for enclosing a portion of the motor frame and an externally positioned rotor mounted on a shaft having an end extending therebeyond, said cover having an aperture through which said end of said shaft can project, thrust bearing means mounted externally on said cover for cooperating with the projecting end of said shaft for limiting endwise movement thereof, said thrust bearing means comprising a nylon strip extending transversely of said aperture and in engagement with said projecting end of said shaft and a resilient metallic strip overlying said nylon strip, and means carried by said cover and supporting both ends of said strips, at least one end being slidably supported.

4. In combination in an electric motor construction, a cover for enclosing a portion of the motor frame and an externally positioned rotor mounted on a shaft having an end extending therebeyond, said cover having an aperture through which said end of said shaft can project, thrust bearing means mounted externally on said cover for cooperating with the projecting end of said shaft for limiting endwise movement thereof, said thrust bearing means comprising a nylon strip extending transversely of said aperture and in engagement with said projecting end of said shaft and a resilient metallic strip overlying said nylon strip, and lugs struck from said cover and interfitting with the ends of said strips to hold the same in operative position.

5. In an electric motor construction, in combination, an annular frame, a shaft journaled on said frame and projecting beyond at least one end thereof, a rotor fast on said shaft at said one end of said frame with said shaft projecting therebeyond, electric field generating means carried by said frame for driving said rotor, a cover enclosing said rotor and telescoped with said frame, said cover having an aperture through which said shaft projects, a thrust bearing carried by said cover on the outer side thereof and cooperating with the projecting end of said shaft to limit endwise movement thereof, a resilient strip extending transversely of said aperture and urging said thrust bearing against said shaft, and lugs struck from said cover and interfitting with the ends of said resilient strip to hold the same in operative position.

6. In an electric motor construction, in combination, an annular frame, a shaft journaled on said frame and projecting beyond at least one end thereof, a rotor fast on said shaft at said one end of said frame with said shaft projecting therebeyond, electric field generating means carried by said frame for driving said rotor, a cover enclosing said rotor and telescoped with said frame, said cover having an aperture through which said shaft projects, a thrust bearing carried by said cover on the outer side thereof and cooperating with the projecting end of said shaft to limit endwisie movement thereof, a resilient strip extending transversely of said aperture and urging said thrust bearing against said shaft, and means carried by said cover supporting the ends of said resilient strip, said support means endwise slidably mounting at least one end of said strip.

References Cited in the file of this patent

UNITED STATES PATENTS

| | | |
|---|---|---|
| 2,424,020 | Chatelain | July 15, 1947 |
| 2,493,999 | Riley | Jan. 10, 1950 |
| 2,615,069 | Gallagher | Oct. 21, 1952 |

FOREIGN PATENTS

| | | |
|---|---|---|
| 324,868 | Great Britain | Feb. 6, 1930 |
| 415,168 | Great Britain | Aug. 23, 1934 |
| 150,716 | Switzerland | Feb. 1, 1932 |